United States Patent [19]

Schaefer

[11] Patent Number: 4,977,019
[45] Date of Patent: Dec. 11, 1990

[54] MAGNETOOPTICAL RECORDING MEDIUM BONDED WITH A FLEXIBLE FOAM ADHESIVE

[75] Inventor: Eckhard Schaefer, Hofheim-Langenhain, Fed. Rep. of Germany

[73] Assignee: Hoechst Aktiengesellschaft, Frankfurt am Main, Fed. Rep. of Germany

[21] Appl. No.: 337,838

[22] Filed: Apr. 14, 1989

[30] Foreign Application Priority Data

Apr. 20, 1988 [DE] Fed. Rep. of Germany ....... 3813171

[51] Int. Cl.$^5$ .............................................. B32B 7/12
[52] U.S. Cl. ................................ 428/317.5; 428/614; 428/698; 428/900
[58] Field of Search ......................... 428/317.1–317.9, 428/694, 698, 900; 360/131, 135; 365/122; 369/13, 14

[56] References Cited

U.S. PATENT DOCUMENTS

| 4,751,124 | 6/1988 | Matsuzawa et al. | 428/65 |
| 4,782,477 | 11/1988 | Ichihara et al. | 369/286 |
| 4,821,050 | 4/1989 | Yabe et al. | 428/694 |
| 4,870,429 | 9/1989 | Fujita et al. | 428/694 |

FOREIGN PATENT DOCUMENTS 0235812 9/1987 European Pat. Off. .

OTHER PUBLICATIONS

Suh et al., "Latent Heat Effects of Pulsed Laser Beam Induced Temperature Profiles in Optical Recording Thin Films", Optical Society of America, *Applied Optics*, vol. 23, No. 22, Nov. 15, 1984, pp. 3965–3971.

*Primary Examiner*—George F. Lesmes
*Assistant Examiner*—Dennis Carmen
*Attorney, Agent, or Firm*—Foley & Lardner, Schwartz, Jeffery, Schwaab, Mack, Blumenthal & Evans

[57] ABSTRACT

An information recording element consists of one or two substrates, on each of which a magnetooptical recording layer enclosed on both sides by dielectric layers is applied. The composite consisting of substrate - dielectric layer-recording layer-dielectric layer is adhesively bonded to a further substrate or to a plastic layer by means of a flexible adhesive foam layer applied over the entire surface. In the case of adhesive bonding over the entire surface, air gaps are excluded. The thermal stability of the adhesive foam layer ranges from about −40° C. to +150° C. and the adhesive foam layer is resistant to solvents and plasticizers. The heat penetration coefficient of the adhesive foam layer is lower than the heat penetration coefficient of quick-curing adhesives and of polyurethane adhesives which cure by moisture absorption, and is less than about 450 W.s$^{\frac{1}{2}}$/K.m$^2$.

9 Claims, 3 Drawing Sheets

MAGNETOOPTICAL RECORDING MEDIUM BONDED WITH A FLEXIBLE FOAM ADHESIVE

BACKGROUND OF THE INVENTION

The present invention relates to an information recording element comprising at least one substrate on which a magnetooptical recording layer enclosed on both sides by dielectric layers is applied.

SUMMARY OF THE INVENTION

Magnetooptical disks generally have an information recording layer bonded over the entire surface. There may or may not be an additional layer of coating resin between the adhesive and the information recording layer.

Magnetooptical disks may also have, for example, an air sandwich structure in which an air gap is present between the recording layer applied to the substrate, and an outer cover layer. The recording layer as such may additionally be enclosed on both sides by dielectric layers. In so-called double-sided information recording media or elements, two substrates, each of which carries a recording layer, are combined such that the recording layers are opposite one another a distance apart, spacers being provided at both the inner and outer circumference of these elements. Such optical information recording elements are described in, for example, EP-A1-0 235 812.

German Offenlegungsschrift 37 05 237 discloses a magnetooptical information recording medium having two recording elements, each comprising a substrate and a magnetooptical recording layer arranged on part of a surface of the substrate. The two recording elements adhere to each other with front surfaces opposite one another, by means of an adhesive which does not cause any corrosion of the recording layers and is applied to a part of the surface on which a magnetooptical recording layer is present. On the other part of the surface, on which there is no recording layer, a quick-curing adhesive is applied. The adhesive is a moisture-curing polyurethane adhesive of the one-component liquid type that causes no corrosion. The quick-curing adhesive is selected from the group consisting of adhesives curing by ultraviolet radiation, adhesives of the cyanoacrylate type and adhesives of the reactive acrylate type.

Both from the point of cost and in particular with regard to the proper operation of information recording elements in the form of disks, it is advantageous if, instead of air sandwich structures, the disks are designed so that spacers between the individual layers of the disk composite are avoided and instead the surfaces of the adjacent layers are bonded directly to one another over the entire surface. It is found that, if the layers are bonded to one another by applying curable adhesives, the required write power of the write laser for recording the information must be greatly increased, for example from about 5.2 mW to 8 mW or more. In practice, this means that an information recording element of this type may become unsuitable as a storage disk since the conventional write lasers for magnetooptical storage disks generally operate in the write power range between 5 and 7 mW.

Investigations into liquid adhesives for bonding the layers of a magnetooptical storage disk show that in general about 43% higher write power of the write laser is required compared with an unbonded disk.

OBJECTS OF THE INVENTION

It is therefore an object of the present invention to improve information recording elements, such as, for example, magnetooptical disks in which adjacent layers are bonded to one another, so that the write laser power required for recording the data is much less than the write power for recording on a magnetooptical disk whose layers are bonded to one another by liquid adhesives.

These and other objects according to the invention are achieved in one embodiment of the invention by an information recording element comprising two composites, each composite comprising a substrate having a magnetooptical recording layer sandwiched between dielectric layers thereon, and a flexible adhesive foam layer hermetically bonding the entire surface of one of the composites to the other composite without air gaps, wherein the foam layer is thermally stable from about $-40°$ C. to $+150°$ C. and is resistant to plasticizers and solvents. In another embodiment of the invention, a support layer is arranged between the two composites, and each composite is hermetically bonded to the support layer, over the entire surface, by means of the flexible adhesive foam layer without air gaps.

The objects of the invention are also achieved by an information recording element comprising at least one composite comprising at least one substrate having a magnetooptical recording layer sandwiched between dielectric layers thereon, a plastic layer, and a flexible adhesive foam layer hermetically bonding the entire surface of the plastic layer to the composite, wherein the foam layer is thermally stable from about $-40°$ C. to $+150°$ C. and is resistant to plasticizers and solvents.

In a preferred embodiment of the invention, the heat penetration coefficient of the adhesive foam layer is smaller than the heat penetration coefficient of quick-curing adhesives and of polyurethane adhesives that cure by moisture absorption, and is less than about 450 $W·s^{\frac{1}{2}}/°K·m^2$. It is desired that the adhesive foam layer have a closed-cell foam core with self-adhesive surfaces. Both core and surface contain an acrylate copolymer adhesive.

According to the invention, the substrate/ dielectric layer/recording layer/dielectric layer composite, or a composite of this type having a cover layer, can be adhesively bonded reliably without reducing the write sensitivity of the magnetooptical recording layers to an unacceptable degree. As a result of adhesively bonding the composites with a flexible adhesive foam layer having a lower heat penetration coefficient than dense adhesive layers, the adhesive bond remains permanently flexible and also produces no additional stresses, as may easily occur in the case of reactive adhesives. The adhesive foam layer can be applied at room temperature, without difficulty, to the layers of the information recording element that are adhesively bonded to one another.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
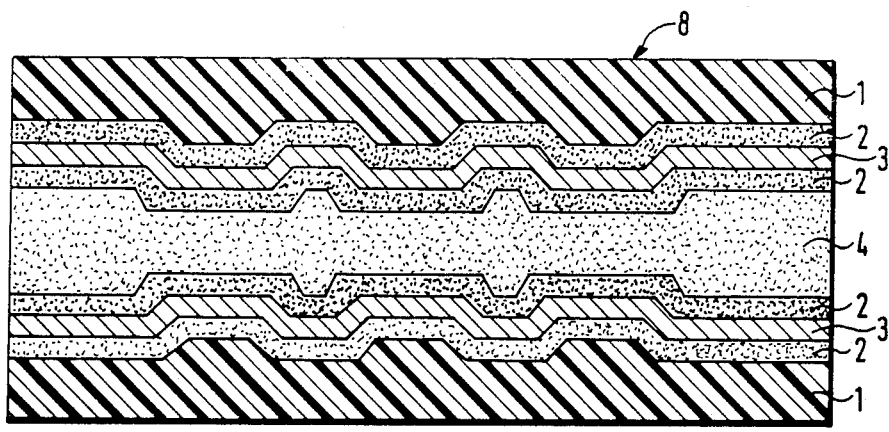
FIG. 1 is cross-sectional view of a first embodiment of an information recording element according to the invention.

FIG. 1 is a schematic section through an information recording element 8 comprising two substrates 1, 1. Each substrate 1 serves as a baseplate for magnetooptical recording layer 3 enclosed on both sides by dielectric layers 2, 2. The dielectric layers 2, 2 are, for example, silicon nitride or aluminum nitride layers, which protect the magnetooptical recording layer 3 from corrosion. Substrates 1, 1 have groove structures on their surfaces. The grooves shown in FIG. 1 are substantially enlarged as compared to the practical embodiment. The two composites, each consisting of substrate 1—dielectric layer 2—recording layer 3—dielectric layer 2, are arranged so that recording layers 3, 3 face inward, and are hermetically bonded to one another over the entire surface by flexible adhesive foam layer 4. No air gap is present between the two composites.

Flexible adhesive foam layer 4 has thermal stability from about −40° C. to +150° C. and is resistant to both plasticizers and solvents. The heat penetration coefficient b of the adhesive foam layer is lower than the heat penetration coefficient of dense adhesive layers which consist of, for example, quick-curing adhesives or polyurethane adhesives that cure by moisture absorption. In general, the heat penetration coefficient of the adhesive foam layer is less than about 450 W·s$^{\frac{1}{2}}$/°K·m$^2$. For example, the adhesive foam layer preferably comprises a closedcell adhesive core with self-adhesive surfaces and contains, in particular, an acrylate copolymer adhesive. A specific example of such an adhesive foam layer is the product "Acrylic Foam" from Minnesota Mining and Manufacturing Co., 3M, USA.

Various materials are useful for substrate 1, including different glass types and in particular plastics, such as polymethyl methacrylate, polyvinyl chloride, cellulose triacetate, polycarbonate, polyolefins, polystyrene and epoxy resins and blends of the stated plastics, this list being by no means complete.

As already mentioned, suitable materials for the dielectric layers are in particular aluminum nitride (AlN) and silicon nitride (Si$_3$N$_4$), as well as silica (SiO$_2$), zinc sulfide (ZnS) and indium tin oxide (ITO).

Magnetooptical recording layer 3 is made of known materials that are generally amorphous alloys of rare earths and transition metals having an axis of easy magnetizability at right angles to the layer surface. Known materials include the alloys TbFe, GdFe, GdCo, TbFeCo, GdTbFeCo, NdDyFeCo and the like. The individual layers are applied to the substrate in a known manner by sputtering, so that a composite structure of substrate 1—dielectric layer 2—recording layer 3—dielectric layer 2 is formed, magnetooptical recording layer 3 being sandwiched between dielectric layers 2, 2.

Figure 2:
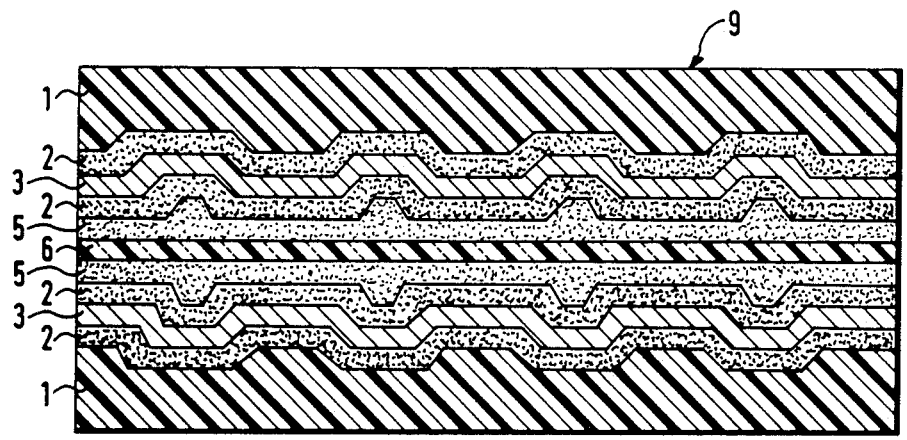
FIG. 2 is a cross-sectional view of a second embodiment of the invention.

FIG. 2 shows information recording element 9, according to a further embodiment of the invention. Like the first embodiment of FIG. 1, this information recording element comprises two composites arranged symmetrically. However, support layer 6 is arranged between the two opposite composites of substrate 1—dielectric layer 2—recording layer 3—dielectric layer 2. Support layer 6 may, for example, be of the same material as substrates 1, Each composite is hermetically bonded to support layer 6 by flexible adhesive foam layer 5 over the entire surface, with exclusion of air gaps. An adhesive foam layer 5 is first applied to each face of support layer 6. A composite is then placed on each side of support layer 6 in contact with adhesive foam layer 5 and the entire structure is compressed to give information recording element 9. Instead of adhesive foam layer 5, it is also possible to use an adhesive of a pure, transparent acrylate polymer in film form, as is obtainable commercially, for example, under the product name "Isotac" from Minnesota Mining and Manufacturing Co., 3M, USA.

Figure 3:
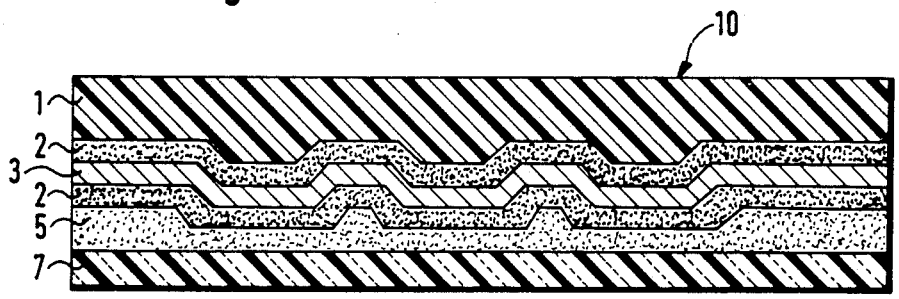
FIG. 3 is a cross-sectional view of a third embodiment of the invention.

FIG. 3 shows, in section, information recording element 10 capable of recording on one side. This element comprises substrate 1, magnetooptical recording layer 3 sandwiched between dielectric layers 2, 2, adhesive foam layer 5 and plastic layer 7 as a backing of information recording element 10. Cover 7 may, for example, be of the same material as substrate 1 or of the same material as support layer 6 in the second embodiment of the invention according to FIG. 2.

Investigations have shown that recording elements having dense adhesive layers for bonding the disks containing the recording layers require a considerable increase in the power of the write laser in order to produce high-contrast signal recording as compared to composites that are not adhesively bonded to one another, such as, for example, those described in EP-A1-0 235 812 in which there is an air gap between the recording layer and an outer cover layer. The laser energy available in the write laser may no longer be sufficient for satisfactory recording in the recording elements using the dense adhesives. This decrease in sensitivity, i.e., the necessity of increasing the power of the write laser compared with a recording element whose layers are not adhesively bonded to one another, indicates that the write laser power incident on the magnetooptical recording layer is only partially dissipated by the metallic recording layer, with the remaining energy taking a different path. This is surprising in that the magnetooptical recording layers are protected on both sides by transparent, glassy silicon nitride layers for the purpose of corrosion protection that have always been thought to provide adequate thermal insulating action to prevent escape of the incident write laser energy.

The differences between the thermal conductivities of air with λ of 0.024 W/°K·m and plastic with λ of 0.2 W/°K·m are so small compared with the heat conductivity of a metal layer with λ of about 20 W/°K·m, that the decrease in sensitivity cannot be explained by this alone. Furthermore, the decrease in sensitivity is not adequately explained by the approximately ten times larger interface between that metal volume of the magnetooptical recording layer heated by the write laser beam and plastic in comparison with metal. The high thermal conductivity of a metal layer suggests in principle radial heat conduction within the metal layer from the recorded spot into the adjacent regions of the metal layer.

A possible explanation for the decrease in sensitivity is obtained from theoretical calculations of the heat removal during the write process with a laser in a metal layer, for example a tellurium layer, that is applied to a plastic substrate. These calculations show that a major part of the heat is very rapidly conducted into the plastic substrate and is not passed on into the metal layer, although metal has a substantially higher thermal conductivity than plastic (*Applied Optics*, Vol. 23, No. 22, 15.11.84, pages 3965-3971, in particular page 3969, right-hand column, "Latent heat effects of pulsed laser beam induced temperature profiles in optical recording thin films," by S. Y. Suh and T. L. Anderson). These calculations and experimental investigations show that in particular the heat penetration coefficient $b=(\lambda \cdot \rho c_p)^{\frac{1}{2}}$ in $W \cdot s^{\frac{1}{2}}/°K \cdot m^2$ of a plastic layer or adhesive layer must be considered. The heat penetration coefficient indicates the quantity of heat which has penetrated a body in a certain time after a sudden increase in the surface temperature ("Warmeleitung" [Heat Conduction], authors U. Grigull and H. Sandner, Springer-Verlag, Berlin, Heidelberg, New York, 1979, page 15 et seq). In the relationship for the heat penetration coefficient b, $\lambda$ is the thermal conductivity in $W/°K \cdot m$, $c_p$ is the specific heat capacity in $J/kg \cdot K$ and $\rho$ is the specific density of the layer in $kg/m^3$. The values for the heat penetration coefficient b are about 6 for air, 600 for plastic and about 10000 for metal, in each case in SI units $W \cdot s^{\frac{1}{2}}/°K \cdot m^2$.

The ratio of the thermal conductivity of metal to that of plastic, using the $\lambda$ values stated above, is 100, whereas the ratio of the heat penetration coefficient b of metal to that of plastic gives a value of about 17. These numbers show that the quantity of heat penetrating the adhesive layer, which in general is an organic layer or plastic layer, has a larger share of the heat removed than does the quantity of heat transported in the radial direction in the recording layer. If it is also taken into account that the thickness of the adhesive layer is substantially greater than the thickness of the magnetooptical recording layer, the effect of penetration of the quantity of heat into the adhesive layer is magnified. The above-mentioned differences in the heat penetration coefficients are sufficiently large to explain the reduction in sensitivity that occurs as a result of applying a dense adhesive layer to a composite which, inter alia, also contains the magnetooptical recording layer.

So-called sensitivity curves have been plotted for some of the following embodiments of the invention, and the curves are described in detail below.

EXAMPLE 1

Dielectric layer 2 consisting of $Si_3N_4$, magnetooptical recording layer 3 consisting of GdTbFe and dielectric layer 2 consisting of $Si_3N_4$, are applied by sputtering, in the stated order, to a prepared polycarbonate substrate 1.

A self-adhesive foam layer 5 in the form of an adhesive foam tape, "Scotch Acrylic Foam Y 4930" from Minnesota Mining and Manufacturing Co., 3M, USA, is laminated with the free dielectric layer 2. After the protective film is peeled off the adhesive foam tape, plastic layer 7 consisting of a polycarbonate material is applied as a protective cover (cf. FIG. 3). Information recording element 10 thus obtained is placed in a recording/playback apparatus and a write/read test is carried out. In this test, a symmetrical rectangular recording signal of constant frequency and constant form, but different amplitudes, corresponding to different write laser powers, is recorded. This recorded signal is read with a constant laser power of 1.4 mW at a frequency of 500 kHz, a constant linear velocity of the information recording element of 4 m/s and a constant position of the read laser at a distance of 45.5 mm from the midpoint of the information recording element. The read signal obtained is further processed in a spectrum analyzer and evaluated using a computer.

Figure 4:
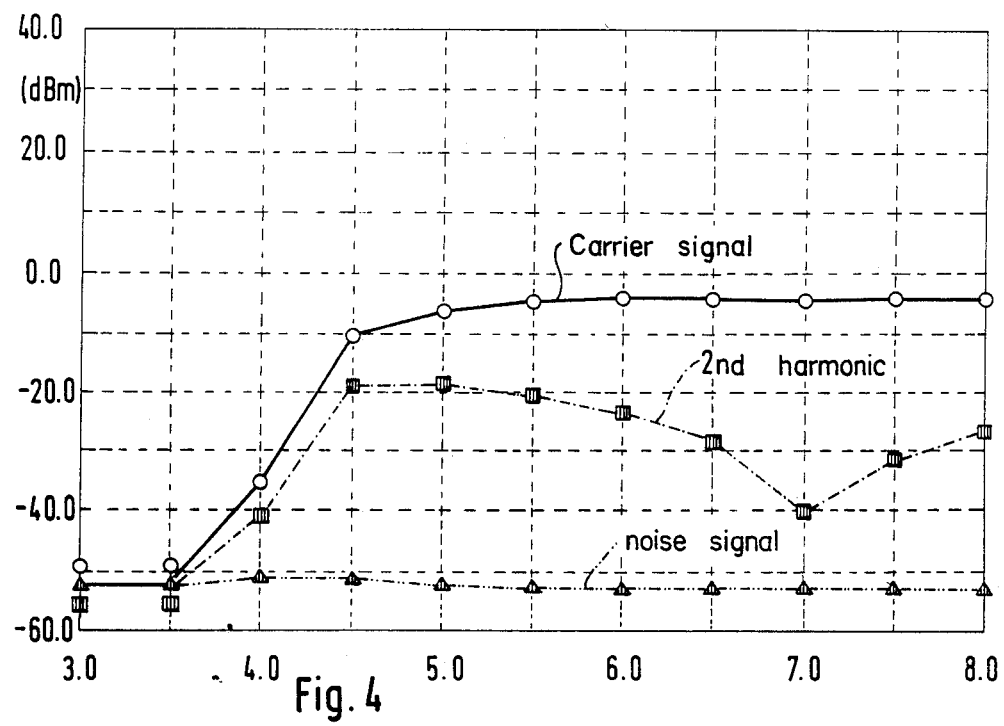
FIGS. 4 through 6 are so-called sensitivity curves of the calculated read signals obtained from a symmetrical rectangular signal recorded on two magnetooptical disks according to the invention and one comparative disk, respectively.

FIG. 4 shows the curves derived from the read signal, in particular the so-called sensitivity curve, for information recording element 10. The write laser power in mW is given on the abscissa of FIG. 4, and the amplitudes of the carrier signal, the second harmonic of the carrier signal and the noise in dBm are given on the ordinate. The carrier signal curve over the write laser power shows the amplitude of the reproduced rectangular recording signal, and the frequency of this carrier signal corresponds to the frequency of the write signal. In the spectrum analyzer, the rectangular carrier signal is separated into a harmonic spectrum that shows, in particular, the amplitude of the second harmonic oscillation, that is not present in the ideal case of a rectangular carrier signal. The curve of the second harmonic over the write laser power has a minimum at a write laser power of 7.0 mW. This minimum in the curve of the second harmonic of the carrier signal indicates the write power at which the smallest distortion in the recording of the information occurs and establishes the bias setting at which recording preferably takes place in order to achieve substantially undistorted recording of information.

The write power of 7.0 mW for the recording of information on information recording element 10 is higher than in the case of a disk that is not adhesively bonded, but is still within the working range of from 7 to 8 mW of the write laser and is also lower than that required in the comparative information recording elements described below.

EXAMPLE 2

An information recording element similar to information recording element 10 described above is prepared by laminating an adhesive film that is adhesive on one side and consists of pure transparent acrylate polymer with the composite consisting of substrate 1—dielectric layer 2—magnetooptical recording layer 3—dielectric layer 2.

Figure 5:
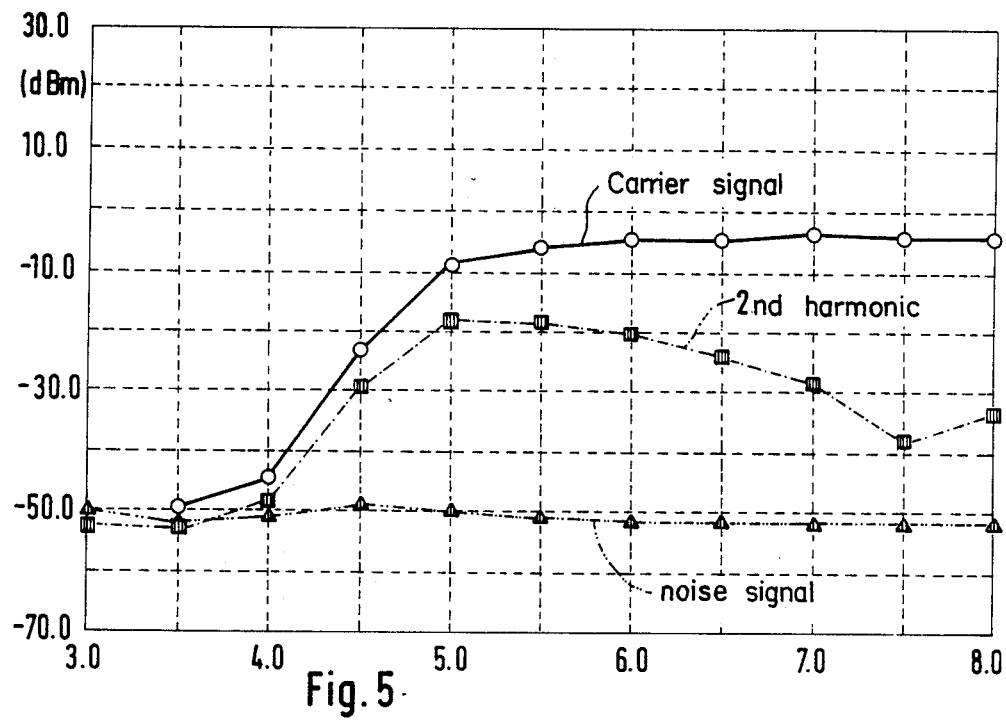

Recording and measurement of the recorded symmetrical rectangular signal are carried out in the manner described in Example 1. Measurement of the characteristics of the recorded carrier signal with the read laser gives the curves shown in FIG. 5 for the carrier signal, the second harmonic oscillation of the carrier signal and the noise level. The curve of the second harmonic oscillation has a minimum at a write laser power of 7.5 mW. Thus, this information recording element is also sufficiently sensitive for information recording in practice.

COMPARATIVE EXAMPLE

An information recording element having a structure as described in Example 1 is coated directly with a cover layer of polyurethane adhesive of the one-component reactive type, Icema R 145/46, from H. B. Fuller GmbH, Germany.

Figure 6:
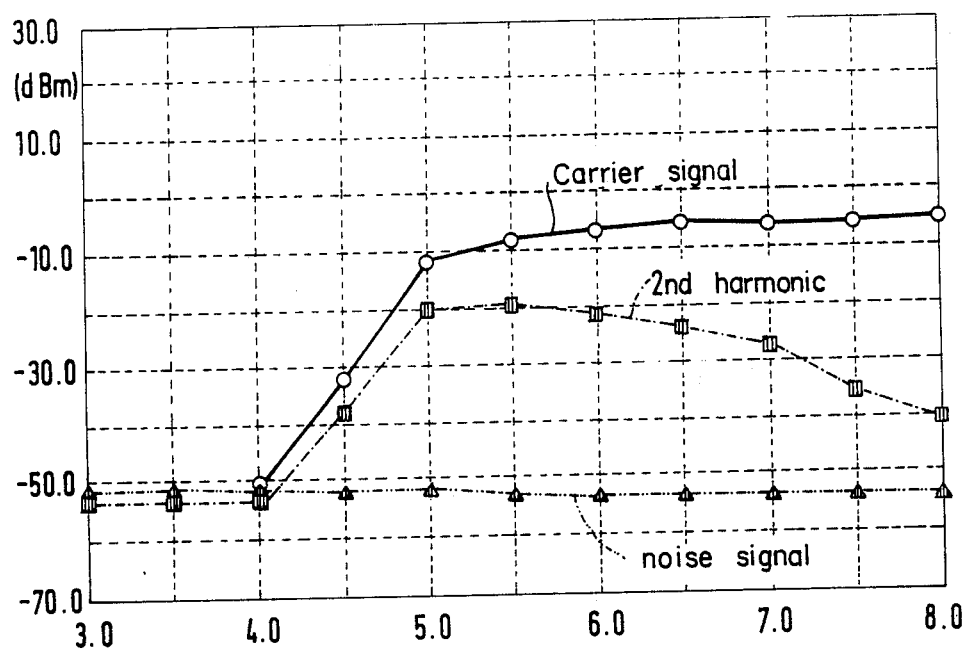

The curves for the carrier signal, the second harmonic oscillation of the carrier signal and the noise signal ar shown in FIG. 6.

Under the same recording and read conditions as in Example 1, a minimum of the second harmonic of the carrier signal cannot be obtained in the working range up to 8 mW write laser power. The information recording element is too insensitive for practical use and therefore cannot be employed.

The Table below summarizes mean values of test results for various coatings on information recording elements. For this purpose, information recording elements which are each laminated or coated with the same adhesive and have the same structure are evaluated and the curves or data obtained are averaged.

The carrier signal-to-noise ratios are measured at the optimum write powers stated in the Examples. The ratios are not optimized since only the relative changes are relevant for the adhesion tests. A decrease in the carrier signal/noise ratios of about 1 dB between the unbonded and bonded states of the information recording element is regarded as acceptable and gives usable recording elements. The tests clearly show that adhesives or coatings applied in liquid form make the information recording elements too insensitive for recording and do not give optimum signal characteristics, since the decrease in the carrier signal/noise ratio is greater than 1 dB.

TABLE

Mean values of test results for coatings on information recording elements

| Coating | Write power after coating (mW) | Carrier signal/ noise ratio (dB) Before/After |
|---|---|---|
| Cellulose nitrate protective layer, ERCO RN 2162/011 | 8.0 | 50.1/47.6 |
| Acrylic foam Scotch Y 4930 | 6.5 | 49.9/48.9 |
| PUR adhesive (polyurethane reactive adhesive) ICEMA R 145/46 | 7.8 | 50.5/48.1 |
| Self-adhesive film (polyester self-adhesive film) | 7.2 | 49.6/48.7 |
| Scotch cal | | |

What is claimed is:

1. An information recording element comprising:
   two composites, each composite comprising a substrate having a magnetooptical recording layer sandwiched between dielectric layers thereon; and
   a flexible adhesive foam layer hermetically bonding the entire surface of one of the composites to the other composite,
   wherein the foam layer is thermally stable from about −40° C. to +150° C. and is resistant to plasticizers and solvents and wherein the magnetooptical recording layers face inwardly.

2. An information recording element as claimed in claim 1, additionally comprising a support layer to which two composites are bonded with a flexible adhesive foam layer.

3. An information recording element as claimed in claim 1, wherein the heat penetration coefficient b of the adhesive foam layer is less than about 450 $W \cdot s^{\frac{1}{2}}/°K \cdot m^2$.

4. An information recording element as claimed in claim 3, wherein the adhesive foam layer comprises a closed-cell foam core with self-adhesive surfaces.

5. An information recording element as claimed in claim 4, wherein the foam core comprises an acrylate copolymer adhesive.

6. An information recording element comprising:
   at least one composite comprising a least one substrate having a magnetooptical recording layer sandwiched between dielectric layers thereon;
   a plastic layer; and
   a flexible adhesive foam layer hermetically bonding the entire surface of the plastic layer to the composite,
   wherein the foam layer is thermally stable from about −40° C. to +150° C. and is resistant to plasticizers and solvents.

7. An information recording element as claimed in claim 6, wherein the heat penetration coefficient b of the adhesive foam layer is less than about 450 $W \cdot s^{\frac{1}{2}}/°K \cdot m^2$.

8. An information recording element as claimed in claim 6, wherein the adhesive foam layer comprises a closed-cell foam core with self-adhesive surfaces.

9. An information recording element as claimed in claim 8, wherein the foam core comprises an acrylate copolymer adhesive.

* * * * *